US011161486B2

(12) United States Patent
Rice et al.

(10) Patent No.: US 11,161,486 B2
(45) Date of Patent: Nov. 2, 2021

(54) VEHICLE CONTROL SYSTEM AND METHOD

(71) Applicant: Westinghouse Air Brake Technologies Corporation, Wilmerding, PA (US)

(72) Inventors: Danial Rice, Frederick, MD (US); Charles L. Wolf, Olney, MD (US); Alan Laurance Cortie, Baltimore, MD (US); Paul Gerard Bender, Clarksburg, MD (US)

(73) Assignee: Westinghouse Air Brake Technologies Corporation, Wilmerding, PA (US)

(*) Notice: Subject to any disclaimer, the term of this patent is extended or adjusted under 35 U.S.C. 154(b) by 98 days.

(21) Appl. No.: 16/578,669

(22) Filed: Sep. 23, 2019

(65) Prior Publication Data

US 2020/0017084 A1 Jan. 16, 2020

Related U.S. Application Data

(63) Continuation-in-part of application No. 15/240,429, filed on Aug. 18, 2016, now Pat. No. 10,464,584.

(51) Int. Cl.
*B60T 8/17* (2006.01)
*B60T 17/22* (2006.01)
*B61H 13/34* (2006.01)

(52) U.S. Cl.
CPC .......... *B60T 8/1705* (2013.01); *B60T 17/228* (2013.01); *B61H 13/34* (2013.01); *B60T 2270/402* (2013.01); *B60T 2270/413* (2013.01)

(58) Field of Classification Search
CPC ............... B60T 8/1705; B60T 17/228; B60T 2270/402; B60T 2270/413; B61H 13/34
See application file for complete search history.

(56) References Cited

U.S. PATENT DOCUMENTS

| 6,229,452 B1* | 5/2001 | Kull | B60T 13/665 340/3.51 |
| 6,334,654 B1* | 1/2002 | Root | B60T 13/662 303/15 |
| 6,676,229 B1* | 1/2004 | Marra | B60T 13/665 303/7 |
| 8,028,961 B2* | 10/2011 | Ashraf | B61L 29/28 246/167 R |

(Continued)

OTHER PUBLICATIONS

Office Action dated Mar. 22, 2021 for corresponding application No. MX/a/2017/009519 (3 pages).

(Continued)

*Primary Examiner* — Jason C Smith
(74) *Attorney, Agent, or Firm* — Christopher R. Carroll (57) ABSTRACT

A vehicle control system includes a first controller configured to communicate a first brake command to one or more brake devices of a vehicle system via a communication pathway. The system also includes a second controller configured to monitor the communication pathway to determine whether the first brake command from the first controller is communicated via the communication pathway to the one or more brake devices. The second controller also is configured to implement a backup brake command to the one or more brake devices based on a presence of the first brake command and a level of brake application dictated by the first brake command.

20 Claims, 4 Drawing Sheets

(56) References Cited

U.S. PATENT DOCUMENTS

| | | | |
|---|---|---|---|
| 8,714,494 B2* | 5/2014 | Weber | B61L 15/0063 |
| | | | 246/131 |
| 2008/0269013 A1* | 10/2008 | Minaki | F16H 59/48 |
| | | | 477/86 |
| 2018/0050711 A1* | 2/2018 | Rice | B61L 15/0036 |
| 2020/0017084 A1* | 1/2020 | Rice | B60T 17/228 |

OTHER PUBLICATIONS

English translation of the Office Action dated Mar. 22, 2021 for corresponding application No. MX/a/2017/009519 (3 pages).

\* cited by examiner

VEHICLE CONTROL SYSTEM AND METHOD

CROSS-REFERENCE TO RELATED APPLICATIONS

This application is a continuation-in-part of U.S. patent application Ser. No. 15/240,429, which was filed on 18 Aug. 2016, and the entire subject matter is incorporated herein by reference.

BACKGROUND

Technical Field

The subject matter described herein relates to vehicle systems and control processes, such as vehicle braking systems.

Discussion of Art

Vehicle systems and transportation (e.g., route) networks exist throughout the world, and, at any point in time, a multitude of vehicles, such as cars, trucks, buses, trains, and the like, are travelling. With specific reference to trains travelling in a track network, locomotives may be equipped with or operated using train control, communication, and management systems (e.g., positive train control (PTC) systems), such as the I-ETMS® of Wabtec Corp. To effectively manage movement of the vehicle systems, navigation and enforcement systems and processes can be implemented, both at the vehicle system level and the central dispatch level.

One example of an enforcement system is a braking system. Rail vehicles may include an electronically-controlled pneumatic (ECP) system as a braking system. This ECP system operates using electronic signals rather than changes in brake pipe air pressure to activate brakes.

With respect to ECP braking systems, when an external penalty input is active (e.g., during a cab signal or other penalty condition), a head end unit may communicate a brake command of full brake application (e.g., 100%) on a communication line (e.g., a trainline) to the ECP devices in individual railcars to instruct the individual railcars to apply brakes. The brake command can be communicated as a percentage, for example, a "0% brake command," which indicates that ECP brakes are being commanded to release. A "100% brake command" signifies that ECP brakes are being commanded to deliver a full (e.g., maximum) brake application. A penalty brake application of ECP brakes (e.g., an ECP brake application typically initiated by an external safety system to override a train operator's control) may be a "100% brake command" command from the head end unit.

In some known ECP operations, a single point failure involving the head end unit can prevent the brake command from being successfully communicated to the railcars. For example, it is possible that the other ECP devices on the railcars may receive a brake command of "0%" when the ECP system is requesting a penalty brake command of "100%". This can allow ECP brakes to remain released in a situation where an external safety system is attempting to apply the ECP brakes.

BRIEF DESCRIPTION

In one embodiment, a system (e.g., a vehicle control system) includes a first controller configured to communicate a first brake command to one or more brake devices of a vehicle system via a communication pathway. The system also includes a second controller configured to monitor the communication pathway to determine whether the first brake command from the first controller is communicated via the communication pathway to the one or more brake devices. The second controller also is configured to implement a backup brake command to the one or more brake devices based on a presence of the first brake command and a level of brake application dictated by the first brake command.

In another example, a method (e.g., for controlling a vehicle system) includes monitoring a communication pathway of a vehicle system for a first brake command communicated from a first controller to one or more brake devices of the vehicle system. The communication pathway is monitored by a second controller. The method also can include determining, using the second controller, that the first brake command from the first controller is communicated via the communication pathway to the one or more brake devices and implementing a backup brake command, using the second controller, to the one or more brake devices based on a presence of the first brake command and a level of brake application dictated by the first brake command.

In one example, a vehicle control system includes a first controller configured to electrically communicate a first brake command to one or more brake devices of a vehicle system via a communication pathway and a second controller configured to monitor the communication pathway to determine whether the first brake command from the first controller is communicated via the communication pathway to the one or more brake devices. The second controller also is configured to implement a pneumatic backup brake command to the one or more brake devices based on a presence of the first brake command and a level of brake application dictated by the first brake command.

BRIEF DESCRIPTION OF THE DRAWINGS

The inventive subject matter may be understood from reading the following description of non-limiting embodiments, with reference to the attached drawings, wherein below.

DETAILED DESCRIPTION

The inventive subject matter described herein provides a control system and method for controlling a vehicle system. The description herein focuses on ECP-equipped trains travelling in a track network, but optionally may be used in connection with other vehicle systems, other brake systems, and/or other routes. For example, the subject matter described herein may be used to control brake systems or propulsion systems of vehicle systems formed of automobiles, trucks (e.g., which may be pulling trailers), marine vessels (where the brake system slows movement, such as by reversing direction of a propeller and/or activating a reverse propeller), aircraft (manned or unmanned, such as drones), agricultural vehicles, mining vehicles, or other off-highway vehicles. The inventive subject matter provides communication redundancy for changing movement of vehicle systems, such as by enacting brakes of the vehicle systems, changing propulsion of the vehicles, or the like. The control system and method can provide a redundant controller that independently verifies that a desired brake command is actually communicated from one vehicle (e.g., a lead vehicle or control vehicle) to at least one other vehicle in the vehicle system). In one embodiment, the control system and method described herein may be used to control an ECP brake system of a train.

A first controller of the control system may communicate brake commands to brake devices via a communication pathway. A second controller of the control system that is separate from the first controller can determine whether a brake command is communicated to at least one brake device (on the same or other vehicle in the vehicle system) from the first controller. The second controller can control application of an emergency, fallback, or backup brake command based on the presence of the brake command from the first controller on or within the communication pathway. For example, the second controller can monitor the communication pathway for the presence of a brake command and control application of a pneumatic emergency brake application based on the presence (or absence) and/or percentage level of the brake command, as described herein.

The redundancy in ensuring that a brake command is successfully communicated from a controller to the device(s) that implement the braking action can be provided by a second controller that determines whether a brake command from the other controller (e.g., the first controller) on a communication pathway connecting a lead or control vehicle to one or more other vehicles in the vehicle system. The second controller can be or include a power supply controller.

The communication pathway can be a conductive pathway (e.g., one or more wires, cables, buses, etc.), an optical pathway (e.g., one or more fiber optic cables), a wireless pathway (e.g., for wireless communication), or a combination of two or more of these pathways. With respect to rail vehicle systems, the conductive pathway can include a trainline. In one embodiment, the second, redundant, or backup controller is configured to determine whether the first or primary controller issued a brake command at least partially via a conductive pathway. Responsive to determining that the brake command was issued, the second controller is configured to communicate a redundant or backup brake command via another communication medium (e.g., via a wireless pathway, via a pneumatic change in brake pipe pressure, or the like).

The second controller can automatically implement or facilitate an external penalty brake request to trigger an emergency brake application. The second controller can be programmed or configured to automatically implement or facilitate the external penalty brake request to trigger the emergency brake application based on a determination that the brake command is less than a designated level of brake application (e.g., a 100% command or a full brake application).

The second controller or computer can be programmed or configured to automatically implement or facilitate the external penalty brake request to trigger the emergency brake application by allowing a relay on a signal path to an external safety relay to remain closed to allow the external penalty brake request to trigger the emergency brake application. Optionally, the second controller or computer can be programmed or configured to automatically prevent an external penalty brake request from triggering an emergency brake application based on a determination that the brake command is communicated to at least controlled vehicle in the vehicle system (e.g., a railroad car that is pulled by one or more locomotives in a train). The second controller can be programmed or configured to automatically prevent the external penalty brake request from triggering the emergency brake application based on a determination that the brake command is greater than or equal to a 100% command.

The second controller or computer can automatically prevent the external penalty brake request from triggering the emergency brake application by controlling a relay on a signal path to an external safety relay to open. This can prevent the external penalty brake request from triggering the emergency brake application via the external safety relay.

The control systems and methods described herein may be implemented in a variety of vehicle systems and vehicular networks. While the description may refer to rail vehicles and/or tracks, not all embodiments of the inventive subject matter are limited to rail-based technologies. One or more embodiments may be used in connection with controlling the application of brake systems in other types of vehicles systems. For example, the vehicle systems described herein may be rail vehicle systems, automobiles, trucks, mining vehicles, agricultural vehicles, marine vessels, aircraft, or the like. The vehicle systems may be formed from a single vehicle (e.g., a single propulsion-generating vehicle), or may be formed from multiple vehicles (e.g., multiple propulsion-generating vehicles, or at least one propulsion-generating vehicle and at least one non-propulsion-generating vehicle). The vehicles in a multiple vehicle system may be mechanically coupled with each other, such as by couplers, hitches, or the like, or may be mechanically separate but logically coupled with each other. With respect to logical coupling the vehicles can be separate but communicate with each other to coordinate the individual movements of the vehicles with each other so the vehicles move together as a vehicle system (e.g., as a convoy). In one embodiment, the systems and methods described herein can be used in connection with a railway system and network, such as with train control and management systems (e.g., the I-ETMS® system of Wabtec Corp.).

Figure 1:
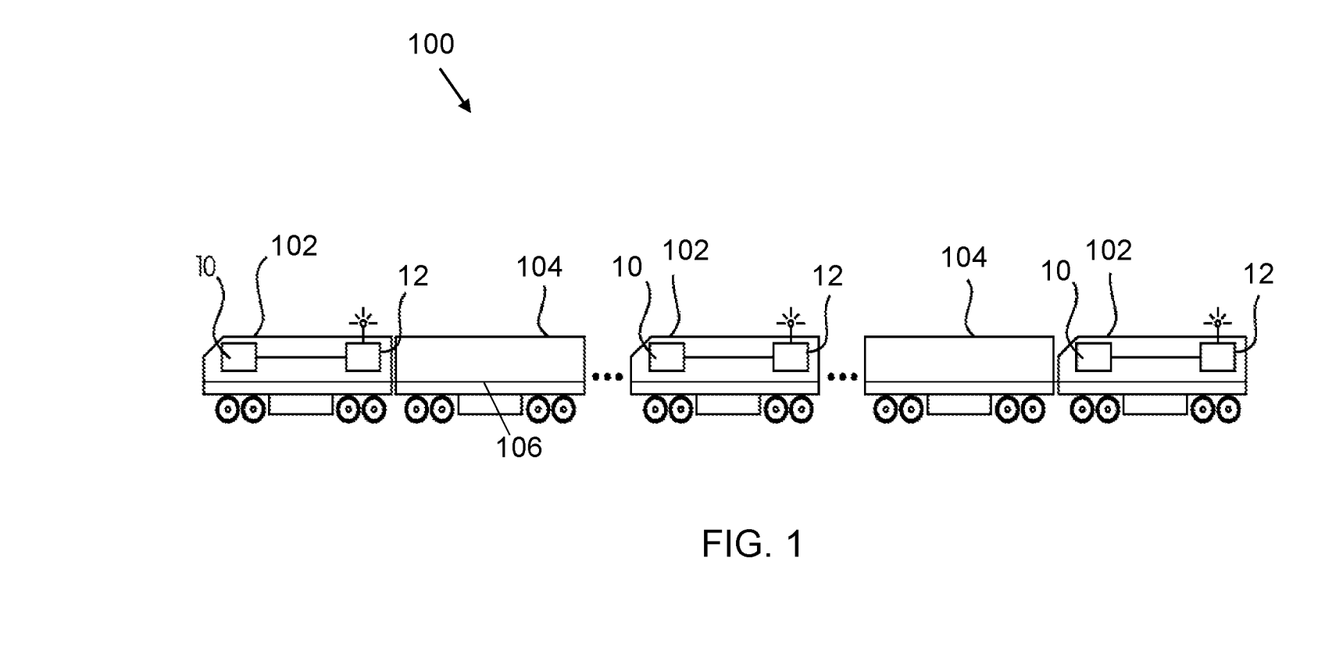
FIG. 1 illustrates one example of a vehicle system with which one or more embodiments of the inventive braking system and method can be used.

FIG. 1 illustrates one example of a vehicle system 100 with which one or more embodiments of the inventive braking system and method can be used. The vehicle system includes one or more propulsion-generating vehicles or control vehicles 102 and, optionally, one or more non-propulsion-generating vehicles 104. The propulsion-generating vehicles can represent vehicles that can propel themselves, such as locomotives, trolleys, automobiles, marine vessels, aircraft (manned or unmanned), agricultural vehicles, mining vehicles, trucks, buses, etc. The non-propulsion-generating vehicles can represent vehicles that cannot propel themselves, such as railcars, passenger cars, trailers, barges, or the like.

The vehicles in a vehicle system optionally are connected to a communication pathway 106 that can extend along or through a length of the vehicle system. In one embodiment, the communication pathway is formed from one or more conductive or wired pathways, such as cables, wires, busses, or the like. For example, the communication pathway can represent an electronically-controlled pneumatic (ECP) trainline in one embodiment. Alternatively, the communication pathway can be formed from one or more wireless connections or networks. Optionally, the communication pathway can be formed from a combination of wired and/or wireless connections. The communication pathway can be used to communicate or otherwise convey data signals and/or power signals between or among the vehicles in the vehicle system.

The vehicle control system and method may be implemented by, programmed or configured on, or otherwise associated with computer(s) or processor(s), such as one or more of the following: a specially-programmed computer, an on-board controller, an on-board computer, a vehicle management computer, a remote server, a back office server, a wayside device, a positive train control component, a networked computer, or any combination thereof. Accordingly, some or all of the operations of the system, process, and method discussed hereinafter may be implemented and/or executed onboard the vehicle system, and similarly, some or all of the operations of the system, process, and method discussed hereinafter may be implemented and/or executed by a computer or processor that is remote from the vehicle system, where the remote computer or processor is in direct or indirect communication with a communication device of the vehicle system.

Figure 2:
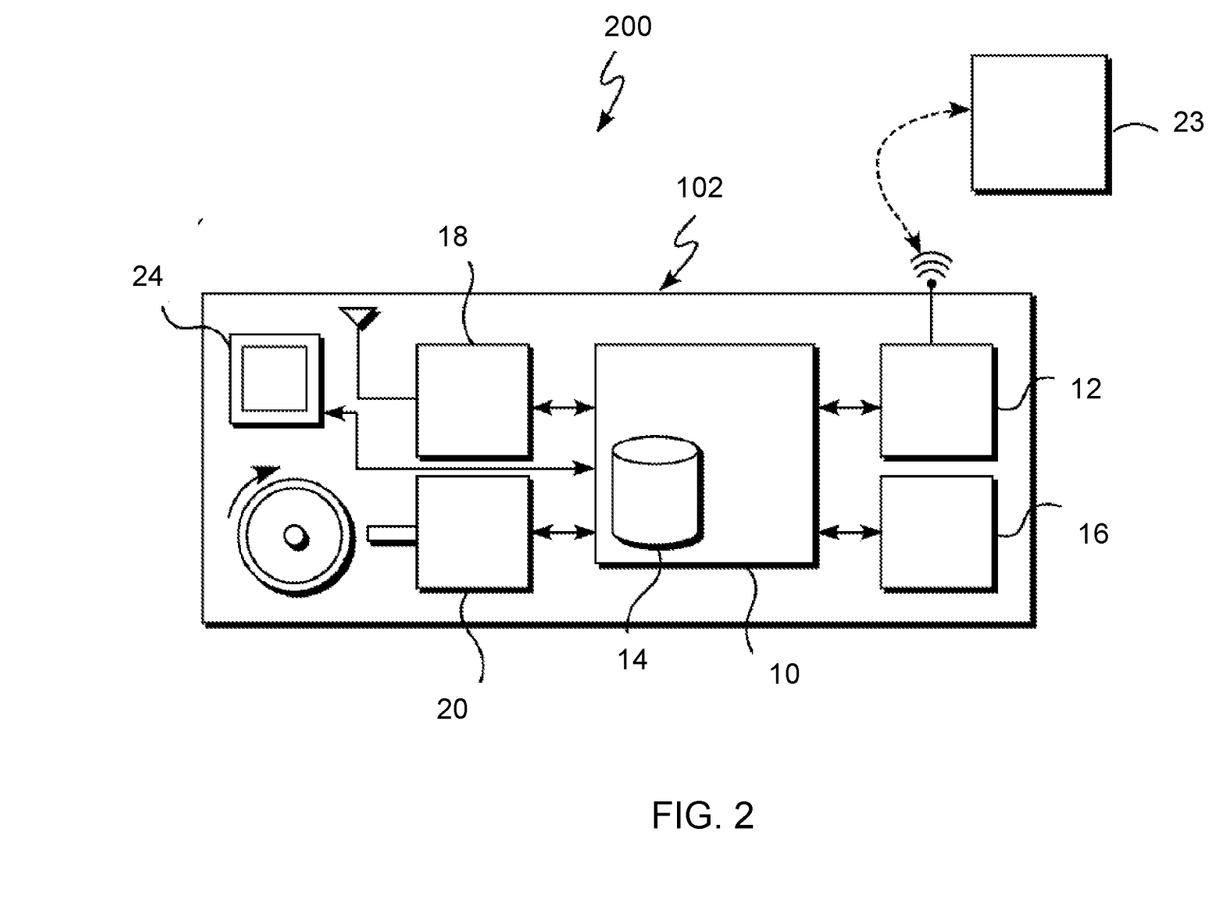
FIG. 2 illustrates one example of a vehicle control system.

With continued reference to the vehicle system shown in FIG. 1, FIG. 2 illustrates one example of a vehicle control system 200. The vehicle control system may be partially or entirely disposed onboard the vehicle system. The control system includes at least one on-board computer 10 programmed or configured to implement or facilitate at least one control action, such as changing a throttle setting, brake setting, engine speed, moving speed, acceleration, or the like, of the vehicle system. The computer can represent hardware circuitry that includes and/or represent one or more processors (e.g., microprocessors, field programmable gate arrays, integrated circuits, controllers, or the like) that perform operations described herein. The control system also includes a communication device 12 that communicates with the on-board computer to receive, send (e.g., transmit and/or broadcast), and/or process data signals. The communication device may be in the form of a wireless communication device and/or also may be programmed or configured to send, process, and/or receive signals over the communication pathway, such as using an ECP component, over conductive pathways external to the vehicle system (e.g., electrified rails, power lines, catenaries, etc.), and/or the like. The communication device can include modems, antennas, transceivers, or the like.

The on-board computer can perform calculations for navigation and enforcement of restrictions on where the vehicle system can travel. For example, the on-board computer can calculate when the vehicle system needs to slow down or stop to avoid entering a restricted area, block, or segment of a route to avoid violating a movement authority or other restriction. The communication device can be used for communications between the on-board computers of several vehicles in the vehicle system, communications with wayside devices (e.g., track or road signals, switch monitors, detectors, and the like), and/or communications with a remote server (e.g., a back office server 23, a central controller, central dispatch, or the like).

A route database 14 represents a tangible and non-transitory computer-readable storage medium, such as a computer hard drive, server, optical disk, etc. The route database can store data representative of information about route positions or locations, locations of switches or intersections along the route(s), locations of crossings along the route(s), route heading changes (e.g., curves in the route), distance measurements (e.g., how far certain landmarks or features are from locations along the route(s)), information about the vehicle system (e.g., the number of propulsion-generating vehicles, the number of non-propulsion-generating vehicles, the types or models of the vehicles, the length of the vehicle system, identification numbers of vehicles having the on-board computer, etc.

The control system also can include a navigation system that generates directions for movement of the vehicle system to travel through one or more locations and/or to arrive at one or more locations. A positioning system 18 includes one or more devices that output data indicative of a location, moving speed, or heading of the vehicle system or one or more vehicles in the vehicle system. For example, the positioning system can include a global positioning system (GPS) receiver, a speed sensor 20 such as a wheel tachometer, a dead reckoning device, or the like.

The control system can include a display device or operator interface 24, such as an electronic display device, touchscreen, monitor, or the like. The display device 24 can provides information and data to an operator of the vehicle system, such as the information, data, and/or screens as described herein. Some or all of the operations and processing described herein may be performed locally by the on-board computer 10, or alternatively, by another computer (e.g., a computer associated with an end-of-train unit, a computer associated with a wayside device, or the like) and/or a remote computer or server (e.g., the back office server 23, a remote computer or server associated with central dispatch, a central controller, a computer-aided dispatch system, and intermediate control computer, or the like).

The on-board computer includes or is in communication with the communication device that facilitates communication by or between the vehicles 102 and/or 104 and optionally some remote server or computer system, e.g., a central controller, a back office server 23, a remote server, central dispatch, back office positive train control system components, various wayside devices, such as signal or switch monitors, or other on-board computers 10 in the vehicle system. Further, this communication may occur wirelessly or in a "hard wired" form.

The on-board computer 10 may be located at any position or orientation on the vehicle system, and the on-board computer 10 (or on-board controller, on-board computer system, vehicle management computer, and/or the like, and which performs the determinations and/or calculations for the positive train control system) includes or is in communication with the route database 14 populated with data and/or which receives specified data and information from other vehicle systems, remote servers, back office servers 23, central dispatch, and/or the like, where this data may include route profile data, information about switch locations, route heading changes (e.g., curves, and distance measurements), vehicle system information, or the like.

A braking system 16 represents one or more brakes disposed onboard the vehicle system that operate to slow or stop movement of the vehicle system. The braking system can represent one or more air brakes, friction or disc brakes, regenerative brakes (e.g., traction motors), or the like. In one embodiment, the control system is an electronically controlled pneumatic (ECP) brake control system, and the braking system is an ECP brake system. Not all embodiments of the vehicle system are limited to a rail vehicle system and not all embodiments of the control system are limited to an ECP brake control system.

Figure 3:
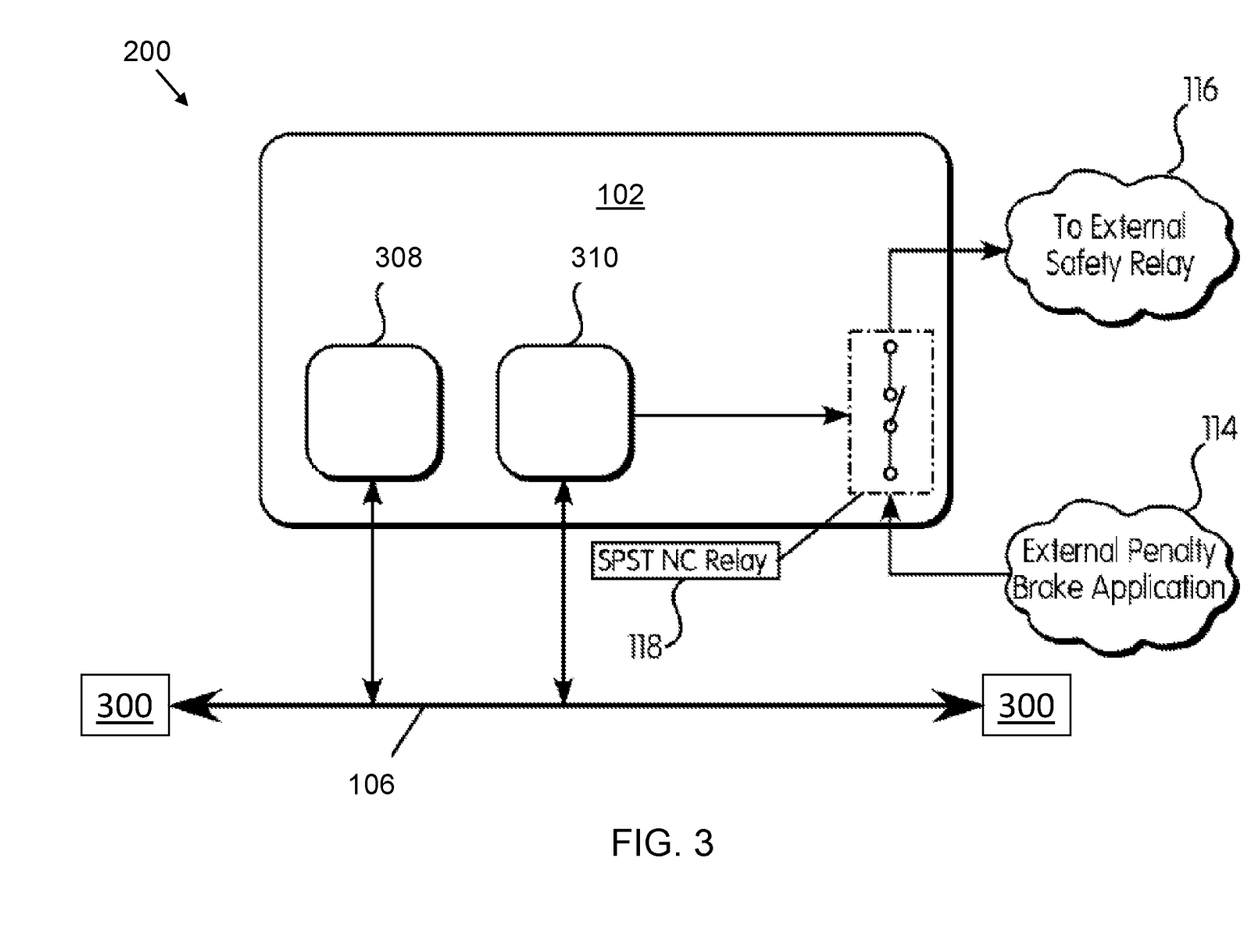
FIG. 3 also illustrates the control system shown in FIG. 2.

FIG. 3 also illustrates the control system 200 shown in FIG. 2. In the vehicle system, one or more (or each) of the propulsion-generating vehicles can include communication nodes for the braking system. These nodes can include a first or master controller 308 and a second or power supply controller 310. In one embodiment, each of these controllers can represent a different computer 10. Alternatively, both controllers can be embodied in the same computer 10.

The first controller can generate a brake command and directly or indirectly communicate the brake command to at least one other vehicle in the vehicle system. For example, the first controller can be responsible for the human-machine interface (HMI) and for controlling overall operation of the braking system including translating a brake handle position, a brake pedal position, a penalty brake request, etc., into a brake command. The first controller can communicate (e.g., directly or via the communication device) the brake command to one or more brake devices 300 of the braking system via the communication pathway. The brake devices can be ECP devices that actuate air brakes of the vehicle system, brake controllers that actuate friction or disc brakes of the vehicle system, motor controllers of traction motors that actuate traction motors to operate in a regenerative braking mode, or the like.

The brake command can direct one or more, or all, of the brake devices to apply brakes to slow or stop movement of the vehicle system. In one embodiment, the brake command is sent to all of the brake devices to cause all brakes of the vehicle system to be actuated at the same time. Alternatively, the brake command can be communicated to a set of some, but not all, of the brake devices of the vehicle system to cause some, but not all, of the brakes of the vehicle system to be actuated at the same time. The brake command can instruct the commanded brakes to enact a full application of the brakes in one example. For example, the brake command can instruct the brakes to be fully actuated to apply a maximum or upper limit on the amount of braking or retarding effort that the brakes can apply. Alternatively, the brake command can instruct some or all of the commanded brakes to enact a partial application of the brakes. For example, the brake command can instruct the brakes to be partially actuated to apply less than the maximum or upper limit on the amount of braking or retarding effort that the brakes can apply. The brake command can be tailored to cause different brakes in the same or different vehicles of the vehicle system to be actuated at different amounts to allow the braking effort applied along the length of the vehicle system to be different at different locations along the length of the vehicle system.

The second controller can monitor and determine whether communication of a brake command to at least one other vehicle system occurs or occurred. For example, the second controller can monitor the communication pathway to determine whether the brake command from the first controller has been communicated along, via, or through the communication pathway. For example, the second controller can receive the brake command via a radio transceiver that is programmed, configured, or adapted to wirelessly communicate radio frequency signals and data over a radio signal communication path.

The second controller can automatically implement or facilitate a backup, fallback, or failsafe brake application based on a determination of the communication of a brake command from the first controller to at least one other vehicle. For example, the second controller can detect a brake command communicated from the first controller along the communication pathway that directs one or more (or all) of the brake devices to apply the brakes at less than a designated threshold. In one embodiment, this threshold is a full brake application (e.g., a brake command of less than 100%) such that, if the commanded brake application is less than a full brake application of all brake devices, the second controller determines that the brake command is less than the threshold. Alternatively, the threshold may be a full brake application for one or more, but not all, of the brake devices. For example, the second controller can determine whether a brake command from the first controller directs one or more, but not all, of the brake devices to apply less than a full brake application of those brake devices. As another example, the threshold may be less than a full brake application for all of the brake devices. For example, the second controller can determine whether the brake command from the first controller directs the brake devices to apply less than 80% (or another threshold amount) of the full brake application. Optionally, the threshold may be less than a full brake application for one or more, but less than all, of the brake devices. For example, the second controller can determine whether the brake command from the first controller directs one or more, but not all, of the brake devices to apply less than 80% (or another threshold amount) of the full brake application.

Responsive to detecting this brake command from the first controller (that is less than the threshold), the second controller can communicate another brake command. This other brake command can be a backup or emergency brake command. For example, this brake command can be a pneumatic brake application that is communicated via an air brake line or conduit and not via the communication pathway 106. Alternatively, the brake command can be communicated in another way, such as in electronic signal(s) communicated via the communication pathway 106, in wireless signal(s) communicated via the communication pathway 106, in electronic signal(s) communicated via another communication pathway other than the communication pathway 106, in wireless signal(s) communicated via another communication pathway other than the communication pathway 106.

The second controller can automatically implement or facilitate this brake application by controlling or allowing a relay on a signal path to an external safety relay 116 to remain closed. This can allow an external penalty brake request 114 to trigger the emergency brake application. For example, if the second controller detects a brake command of less than the threshold has been issued by the first controller, the second controller can ensure a signal path to allow an external penalty brake request 114, if present, to trigger a pneumatic emergency brake application via an external safety relay 116. The second controller can be programmed or configured to control a relay 118 located on the signal path between the external penalty brake request 114 and the external safety relay 116. In one embodiment, the relay 118 can be a single pose single throw normally closed relay. The SPST NC relay is configured, in a default condition or state (e.g., the normally closed condition), to apply an external penalty brake request 114 to drive the external safety relay 116 to cause a pneumatic emergency brake application to stop the vehicle system. The second controller can control or allow the relay 118 to remain closed responsive to the brake command from the first controller being less than the threshold.

The second controller can automatically prevent an external penalty brake request 114 from triggering the emergency brake application responsive to determining that the brake command from the first controller is no less than the threshold. For example, the second controller can detect that the brake command (to one or more, all, or less than all of the brake devices) from the first controller is not less than the threshold. The second controller can prevent the backup or emergency brake command or application from being generated responsive to determining that the brake command from the first controller is not less than the threshold. For example, based on the second controller determining that the brake command from the first controller is greater than or equal to a threshold command by controlling the relay 118 on a signal path to the external safety relay 116. The second controller can control the relay 118 to open and thereby prevent the external penalty brake request 114 from triggering the emergency brake application via the external safety relay. For example, the second controller can control the SPST NC relay 118 to open for values of the brake command from the first controller that are greater than or equal to 100%. The external penalty brake request 114 can be a high or low signal value (1 or 0 value).

Although discussed with respect to a relay, the second controller optionally can control a logic gate or the like to apply or withhold the external penalty brake request 114 on the signal path to the external safety relay 116.

In one embodiment, the emergency brake application can be an irreversible application of the brake devices. This brake application may override any operator-initiated command. For example, the emergency brake application can direct the brake devices to activate to slow or stop the vehicle system even if the operator provides input to release the brake devices. The emergency brake command may be a pneumatic command that is communicated using air-pressure only (e.g., via an air brake line or conduit). This can ensure that the command is communicated independent of the communication pathway to apply the brake devices.

A pneumatic emergency brake application can open a brake pipe dump valve which results in discharge of a brake pipe of the vehicle system. This can cause application of the brake devices on all vehicles in the vehicle system to an upper (e.g., emergency) level, such as full brake application. This can result in a sudden and non-graduated removal of air from the brake pipe, which increases forces between the vehicles in the vehicle system and can deplete all air in the brake system. Recharging this air can consume a considerable amount of time, as may require testing of the braking system before the vehicle system may resume movement. In contrast, ECP braking in response to a brake command (e.g., a brake command of 120% or some lesser or reduced brake command), can result in a partial depletion of the air in the reservoirs needed to apply the brake devices (and not full or complete depletion of the air in the brake pipe). Further, while in an ECP brake application, the reservoirs can begin to charge back to full capacity from the charged brake pipe.

The external penalty brake request 114 can be generated by an external safety system to override the operator control of the vehicle system. For example, the external penalty brake request can be generated by the back office system 23, the computer 10, and/or the controllers 308, 310 responsive to the vehicle system moving faster than a speed limit, responsive to the vehicle system approaching or entering a restricted or unauthorized area, responsive to a vigilance or alerter system indicating that an operator of the vehicle system is not alert, or the like.

Figure 4:
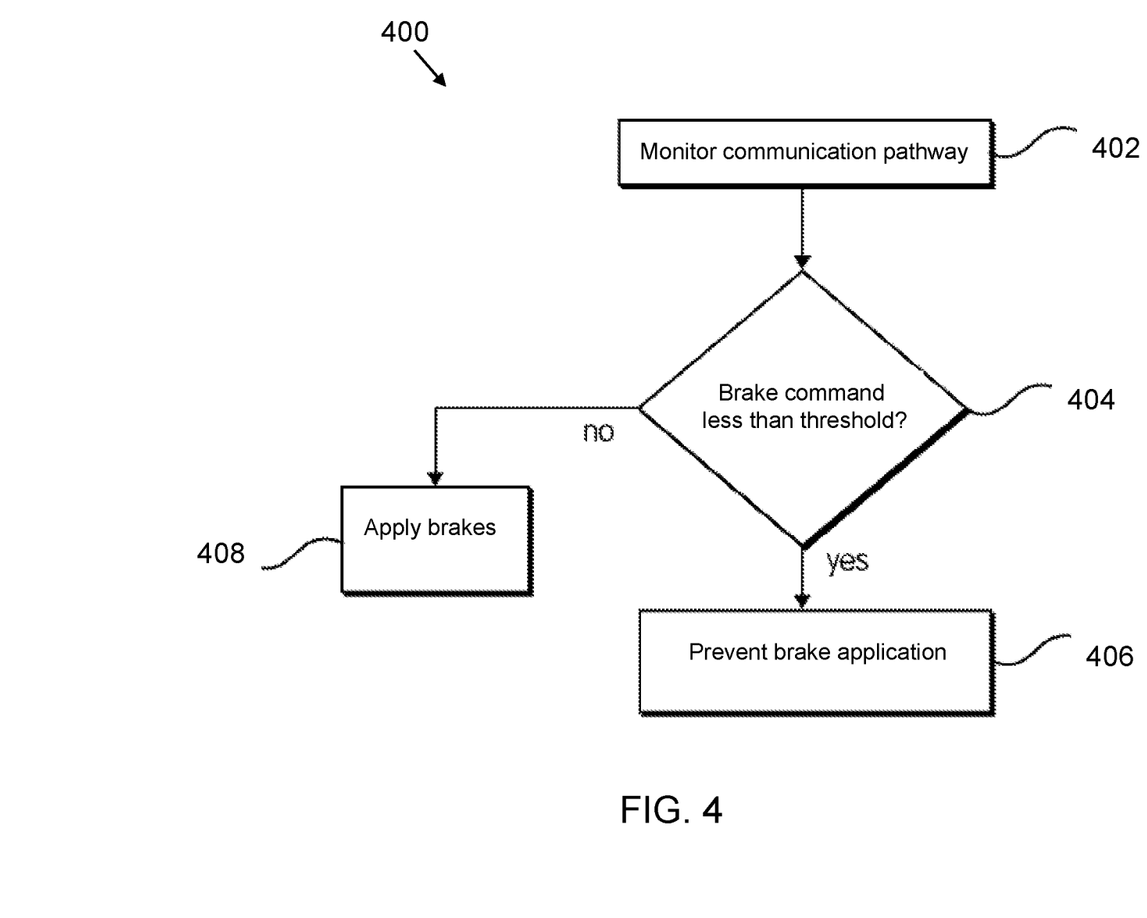
FIG. 4 illustrates a flowchart of one embodiment of a method for controlling a vehicle system.

FIG. 4 illustrates a flowchart of one embodiment of a method 400 for controlling a vehicle system. The method 400 can represent operations performed by the control system described herein. At 402, a communication pathway with brake devices is monitored for brake commands. For example, the second controller 310 can monitor the communication pathway 106 to determine whether a brake command is sent from the first controller 308 to the brake devices 300 via the communication pathway. If no external penalty brake request 114 is present, the second controller can determine (e.g., at 404) whether a brake command of less than a threshold (e.g., a full brake command or 100% application) is present on the communication pathway.

If a brake command of less than the threshold (e.g., less than 100% brake application) is present on the communication pathway, the second controller may not energize the relay 118 (e.g., at 406). For example, the second controller can allow the relay 118 to remain closed in the default state. Because no external penalty brake request 114 is present, the state of the relay 118 may be inconsequential and the external safety relay 116 is not energized. The vehicle system can continue to respond to operator braking commands when no external penalty brake request 114 is present. By allowing the relay 118 to remain closed, if a new external penalty brake request 114 appears on the communication pathway, the request 114 can still trigger the external safety relay 116 in a situation where the brake command is less than the threshold and not able to apply braking sufficient for a penalty braking situation.

The second controller can control the relay 118 to open for other braking command values at 408 (e.g., for braking commands that are greater than or equal to 100%). For example, if a brake command greater than or equal to 100% is present on the communication pathway, braking sufficient for a penalty situation can be applied without resorting to a pneumatic emergency brake application requiring a dump of the brake pipe.

If an external penalty brake request 114 is present, the second controller can determine (e.g., at 404) whether a brake command less than the threshold is on the communication pathway from the first controller. The second controller may not energize the relay 118 (e.g., at 406) to keep the relay 118 in the default closed state if a brake command less than the threshold is present on the communication pathway. This can allow an external penalty brake request 114 to trigger the emergency brake application by energizing the external safety relay 116, thereby overriding an operator braking command and stopping the vehicle system. For example, a braking command less than 100% when a penalty brake request is present can indicate that both an operator (e.g., due to operator error) and the braking system (e.g., due to a single point failure) cannot or have not applied emergency braking to address a penalty braking situation. The second controller thereby independently ensures that brakes are applied for the penalty brake situation by ensuring that the external penalty brake request 114 can energize the external safety relay 116 to trigger emergency braking.

If, however, the second controller determines that a brake command greater than or equal to the threshold is present on the communication pathway at 404, the second controller can open the relay 118 to prevent an external penalty brake application 114 from unnecessarily triggering an emergency brake application.

Accordingly, a vehicle control system and method can improve the safety of a braking system by making braking operations tolerant of failures of a controller (e.g., the first controller) by providing an independent means (e.g., the second controller) for ensuring that brakes are applied.

In one embodiment, a system (e.g., a vehicle control system) includes a first controller configured to communicate a first brake command to one or more brake devices of a vehicle system via a communication pathway. The system also includes a second controller configured to monitor the communication pathway to determine whether the first brake command from the first controller is communicated via the communication pathway to the one or more brake devices. The second controller also is configured to implement a backup brake command to the one or more brake devices based on a presence of the first brake command and a level of brake application dictated by the first brake command.

Optionally, the second controller is configured to implement the backup brake command responsive to the first brake command being detected on the communication pathway. The second controller may be configured to implement the backup brake command responsive to the first brake command directing less than a full application of the one or more brake devices. The second controller may be configured to implement the backup brake command responsive to both the first brake command being detected on the communication pathway and the first brake command directing less than a full application of the one or more brake devices. The second controller may be configured to implement the backup brake command by keeping a relay in a braking system closed.

In one example, the braking system is a pneumatic braking system. The vehicle system may be formed from multiple vehicles, and the first and second controllers may be disposed onboard a common vehicle of the multiple vehicles.

In another example, a method (e.g., for controlling a vehicle system) includes monitoring a communication pathway of a vehicle system for a first brake command communicated from a first controller to one or more brake devices of the vehicle system. The communication pathway is monitored by a second controller. The method also can include determining, using the second controller, that the first brake command from the first controller is communicated via the communication pathway to the one or more brake devices and implementing a backup brake command, using the second controller, to the one or more brake devices based on a presence of the first brake command and a level of brake application dictated by the first brake command.

Optionally, the backup brake command is implemented responsive to the first brake command being detected on the communication pathway. The backup brake command may be implemented responsive to the first brake command directing less than a full application of the one or more brake devices. The backup brake command may be implemented responsive to both the first brake command being detected on the communication pathway and the first brake command directing less than a full application of the one or more brake devices. The backup brake command may be implemented by keeping a relay in a braking system closed. Optionally, the backup brake command can be implemented by keeping the relay in a pneumatic braking system closed.

The communication pathway may be monitored for the first brake command being communicated between different vehicles of the vehicle system.

In one example, a vehicle control system includes a first controller configured to electrically communicate a first brake command to one or more brake devices of a vehicle system via a communication pathway and a second controller configured to monitor the communication pathway to determine whether the first brake command from the first controller is communicated via the communication pathway to the one or more brake devices. The second controller also is configured to implement a pneumatic backup brake command to the one or more brake devices based on a presence of the first brake command and a level of brake application dictated by the first brake command.

Optionally, the second controller is configured to implement the backup brake command responsive to the first brake command being detected on the communication pathway. The second controller may be configured to implement the backup brake command responsive to the first brake command directing less than a full application of the one or more brake devices. The second controller may be configured to implement the backup brake command responsive to both the first brake command being detected on the communication pathway and the first brake command directing less than a full application of the one or more brake devices. The second controller may be configured to implement the backup brake command by keeping a relay in a braking system closed.

The vehicle system may be formed from multiple vehicles, and the first and second controllers can be disposed onboard a common vehicle of the multiple vehicles.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a first controller configured to communicate a first brake command to one or more brake devices of a vehicle system via a communication pathway; and
a second controller configured to monitor the communication pathway to determine whether the first brake command from the first controller is communicated via the communication pathway to the one or more brake devices,
the second controller also is configured to implement a backup brake command to the one or more brake devices based on a presence of the first brake command and a level of brake application dictated by the first brake command.

2. The system of claim 1, wherein the second controller is configured to implement the backup brake command responsive to the first brake command being detected on the communication pathway.

3. The system of claim 1, wherein the second controller is configured to implement the backup brake command responsive to the first brake command directing less than a full application of the one or more brake devices.

4. The system of claim 1, wherein the second controller is configured to implement the backup brake command responsive to both the first brake command being detected on the communication pathway and the first brake command directing less than a full application of the one or more brake devices.

5. The system of claim 1, wherein the second controller is configured to implement the backup brake command by keeping a relay in a braking system closed.

6. The system of claim 5, wherein the braking system is a pneumatic braking system.

7. The system of claim 1, wherein the vehicle system is formed from multiple vehicles, and the first and second controllers are disposed onboard a common vehicle of the multiple vehicles.

8. A method comprising:
monitoring a communication pathway of a vehicle system for a first brake command communicated from a first controller to one or more brake devices of the vehicle system, the communication pathway monitored by a second controller;
determining, using the second controller, that the first brake command from the first controller is communicated via the communication pathway to the one or more brake devices; and
implementing a backup brake command, using the second controller, to the one or more brake devices based on a presence of the first brake command and a level of brake application dictated by the first brake command.

9. The method of claim 8, wherein the backup brake command is implemented responsive to the first brake command being detected on the communication pathway.

10. The method of claim 8, wherein the backup brake command is implemented responsive to the first brake command directing less than a full application of the one or more brake devices.

11. The method of claim 8, wherein the backup brake command is implemented responsive to both the first brake command being detected on the communication pathway and the first brake command directing less than a full application of the one or more brake devices.

12. The method of claim 8, wherein the backup brake command is implemented by keeping a relay in a braking system closed.

13. The method of claim 12, wherein the backup brake command is implemented by keeping the relay in a pneumatic braking system closed.

14. The method of claim 8, wherein the communication pathway is monitored for the first brake command being communicated between different vehicles of the vehicle system.

15. A system comprising:
a first controller configured to electrically communicate a first brake command to one or more brake devices of a vehicle system via a communication pathway; and
a second controller configured to monitor the communication pathway to determine whether the first brake command from the first controller is communicated via the communication pathway to the one or more brake devices,
the second controller also is configured to implement a pneumatic backup brake command to the one or more brake devices based on a presence of the first brake command and a level of brake application dictated by the first brake command.

16. The system of claim 15, wherein the second controller is configured to implement the backup brake command responsive to the first brake command being detected on the communication pathway.

17. The system of claim 15, wherein the second controller is configured to implement the backup brake command responsive to the first brake command directing less than a full application of the one or more brake devices.

18. The system of claim 15, wherein the second controller is configured to implement the backup brake command responsive to both the first brake command being detected on the communication pathway and the first brake command directing less than a full application of the one or more brake devices.

19. The system of claim 15, wherein the second controller is configured to implement the backup brake command by keeping a relay in a braking system closed.

20. The system of claim 15, wherein the vehicle system is formed from multiple vehicles, and the first and second controllers are disposed onboard a common vehicle of the multiple vehicles.

* * * * *